(12) United States Patent
Kim et al.

(10) Patent No.: US 12,180,902 B2
(45) Date of Patent: Dec. 31, 2024

(54) CONTROL METHOD OF VALVE OPENING AND CLOSING FOR AN ENGINE AND A VALVE CONTROL APPARATUS OF THE ENGINE

(71) Applicants: HYUNDAI MOTOR COMPANY, Seoul (KR); KIA CORPORATION, Seoul (KR)

(72) Inventors: Hyeon Woo Kim, Seoul (KR); Back Sik Kim, Osan-si (KR); Jinyoung Jung, Gunpo-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/228,820

(22) Filed: Aug. 1, 2023

(65) Prior Publication Data

US 2024/0102423 A1   Mar. 28, 2024

(30) Foreign Application Priority Data

Sep. 23, 2022   (KR) .......................... 10-2022-0120792

(51) Int. Cl.
*F02D 13/02* (2006.01)
*F02D 41/00* (2006.01)

(52) U.S. Cl.
CPC ..... *F02D 13/0215* (2013.01); *F02D 13/0207* (2013.01); *F02D 13/0261* (2013.01);
(Continued)

(58) Field of Classification Search
CPC ............ F02D 13/0203; F02D 13/0207; F02D 13/0215; F02D 13/0223; F02D 13/0226;
(Continued)

(56) References Cited

U.S. PATENT DOCUMENTS

| | | | |
|---|---|---|---|
| 6,959,692 B2 | 11/2005 | Song | |
| 7,156,072 B2 | 1/2007 | Song | |

(Continued)

FOREIGN PATENT DOCUMENTS

| | | | |
|---|---|---|---|
| DE | 102004018489 A1 | 11/2004 | |
| DE | 102016119525 A1 | 6/2017 | |

(Continued)

OTHER PUBLICATIONS

European Search Report cited in European patent application No. 23197700.0; Feb. 27, 2024; 11 pp.

*Primary Examiner* — Loren C Edwards
(74) *Attorney, Agent, or Firm* — Lempia Summerfield Katz LLC

(57) ABSTRACT

A control method of valve opening and closing for an engine of which an intake continuous variable valve duration (CVVD) apparatus and an intake continuous variable valve timing (CVVT) apparatus are provided on the intake side, and an exhaust continuous variable valve duration (CVVD) apparatus and an exhaust continuous variable valve timing (CVVT) apparatus are provided on the exhaust side. The control method includes: determining, by a controller, a driving region among a predetermined plurality of driving regions according to a speed and a torque of the engine; and controlling, by the controller, opening timing, closing timing, and opening duration of each of an intake valve and an exhaust valve according to the driving region of the engine. The intake valve closing (IVC) timing is before a bottom dead center (BDC) in all driving regions.

29 Claims, 13 Drawing Sheets

(52) U.S. Cl.
CPC .... *F02D 41/0002* (2013.01); *F02D 2041/001* (2013.01); *F02D 2200/1002* (2013.01); *F02D 2200/101* (2013.01)

(58) Field of Classification Search
CPC ............. F02D 13/0234; F02D 13/0242; F02D 13/0246; F02D 13/0249; F02D 13/0261; F02D 2200/1002; F02D 2200/101; F02D 2041/001; F02D 2041/002
See application file for complete search history.

(56) References Cited

U.S. PATENT DOCUMENTS

| | | | |
|---|---|---|---|
| 10,047,683 | B2 | 8/2018 | Ryu et al. |
| 10,145,312 | B2 | 12/2018 | Ryu et al. |
| 10,202,918 | B2 | 2/2019 | Ryu et al. |
| 10,316,763 | B2 | 6/2019 | Ryu et al. |
| 2004/0206317 | A1 | 10/2004 | Song |
| 2006/0009902 | A1 | 1/2006 | Song |
| 2009/0228187 | A1 | 9/2009 | Nakamura |
| 2017/0167393 | A1* | 6/2017 | Ryu .................... F02D 13/0215 |
| 2017/0167396 | A1 | 6/2017 | Ryu |
| 2017/0167398 | A1 | 6/2017 | Ryu et al. |
| 2017/0167399 | A1 | 6/2017 | Ryu et al. |
| 2017/0268435 | A1 | 9/2017 | Ryu et al. |

FOREIGN PATENT DOCUMENTS

| | | |
|---|---|---|
| KR | 101807023 B1 | 12/2017 |
| KR | 101807030 B1 | 12/2017 |
| KR | 101807034 B1 | 12/2017 |
| KR | 101807037 B1 | 12/2017 |

* cited by examiner

CONTROL METHOD OF VALVE OPENING AND CLOSING FOR AN ENGINE AND A VALVE CONTROL APPARATUS OF THE ENGINE

CROSS-REFERENCE TO RELATED APPLICATION

This application claims priority to and the benefit of Korean Patent Application No. 10-2022-0120792 filed in the Korean Intellectual Property Office on Sep. 23, 2022, the entire contents of which are incorporated herein by reference.

BACKGROUND

(a) Field

The present disclosure relates to a valve opening and closing control of an engine. More particularly, the present disclosure relates to a control method of valve opening and closing for an engine that controls the duration and timing of a valve provided with a continuous variable valve duration apparatus and a continuous variable valve timing apparatus on intake and exhaust. Additionally, the present disclosure relates to an engine to which the control method is applied.

(b) Description of the Related Art

The internal combustion engine generates power using explosive pressure by combusting a mixture in which fuel and air are mixed at a predetermined ratio through a predetermined ignition method.

The intake valve and exhaust valve operate by driving the camshaft by the timing belt. The timing belt is connected to the crankshaft that converts the straight movement of the piston by explosion pressure into rotational movement. While the intake valve is open, air is sucked into the combustion chamber, and while the exhaust valve is open, the combust gas is exhausted from the combustion chamber.

Optimum engine performance can be achieved when the opening/closing timing and duration of these intake valves and exhaust valves are adjusted according to driving conditions such as engine rotation speed or torque. Therefore, a Continuous Variable Valve Duration (CVVD) apparatus that controls the opening and closing time (duration) of the intake valve and exhaust valve and a Continuous Variable Valve Timing (CVVT) apparatus that controls the opening and closing timing of the intake valve and exhaust valve have been developed.

The CVVD apparatus controls the duration by controlling the open time of the valve. The CVVT apparatus delays or advances the opening and closing timing of the valve while the open time of the valve (phase) is fixed. In other words, when the opening timing of the valve is determined, the closing timing is automatically determined according to the duration.

However, when the continuous variable valve duration apparatus and the continuous variable valve timing apparatus are combined, it is desired to control both the duration and timing of the valves.

The above information disclosed in this Background section is to enhance understanding of the background of the disclosure. Therefore, the Background section may contain information that does not form the prior art that is already known to a person of ordinary skill in the art.

SUMMARY

The present disclosure has been made in an effort to provide a control method of valve opening and closing for an engine equipped with a continuous variable valve duration apparatus and a continuous variable valve timing apparatus mounted on an intake and an exhaust to control the duration and timing of the intake and the exhaust.

A control method of valve opening and closing for an engine of which an intake continuous variable valve duration (CVVD) apparatus and an intake continuous variable valve timing (CVVT) apparatus are provided in the intake, and an exhaust continuous variable valve duration (CVVD) apparatus and an exhaust continuous variable valve timing (CVVT) apparatus are provided in the exhaust, the control method according to an embodiment of the present disclosure may include determining, by a controller, which driving region corresponds to which of a predetermined plurality of driving regions according to a speed and a torque of the engine. The method further includes controlling, by the controller, opening timing, closing timing, and duration of each intake valve and exhaust valve according to the driving region of the engine. The intake valve closing (IVC) timing may be before bottom dead center (BDC) in all driving regions.

The opening duration of the intake valve may be within 180 crank angle (CA) degrees in all driving regions.

When an operation state of the engine corresponds to a predetermined low torque region, the controller may control the operation of the intake CVVD apparatus, the intake CVVT apparatus, the exhaust CVVD apparatus, and the exhaust CVVT apparatus. The controller may also implement a predetermined reference intake valve closing (IVC) timing, a predetermined reference exhaust valve opening (EVO) timing, the intake valve duration to a predetermined reference intake duration, and the exhaust valve duration to a predetermined reference exhaust duration.

The predetermined reference exhaust valve opening (EVO) timing may be at 180 CA degrees before a top dead center (TDC).

The controller may output a control signal that limits the overlap of the intake and exhaust valves.

When an operation state of the engine corresponds to a predetermined low-medium speed and medium torque region, the controller may output a control signal to increase the exhaust valve duration rather than a predetermined reference exhaust valve duration.

When an operation state of the engine corresponds to a predetermined medium-high speed and medium torque region, the controller may output a signal to retard the intake valve closuring (IVC) timing rather than a predetermined reference intake valve closing (IVC) timing.

The controller may output a signal to increase the intake valve duration rather than a predetermined reference intake duration.

The controller may output a signal to advance the exhaust valve opening (EVO) timing rather than a predetermined reference exhaust valve opening (EVO) timing.

The controller may output a control signal to increase the exhaust valve duration rather than a predetermined reference exhaust duration.

When an operating state of the engine corresponds to a predetermined low speed and high torque region, the controller may output a control signal to reduce the exhaust valve duration rather than a predetermined reference exhaust duration.

The controller may output a control signal to retard the intake valve closing (IVC) timing rather than a predetermined reference intake valve closing (IVC) timing.

The controller may output a control signal so that the exhaust valve opening (EVO) timing is after the bottom dead center.

The controller may output a control signal so that the intake valve closing timing (IVC) approaches the bottom dead center.

The controller may output a control signal to perform a predetermined short valve overlap that utilizes scavenging.

When an operation state of the engine corresponds to a predetermined medium-high speed and high torque region, the controller may output a control signal that delays the intake valve closing (IVC) timing from the predetermined reference intake valve closing (IVC) timing to avoid knocking.

The controller may output a control signal for limiting overlap so that scavenging does not occur.

The controller may output a control signal so that the exhaust valve opening (EVO) timing is before the bottom dead center.

The controller may output a control signal such that the intake valve closing timing (IVC) is retarded than the predetermined reference intake valve closing (IVC) timing.

The controller may output a control signal so that the intake valve opening timing (IVO) and the exhaust valve closing (EVC) timing are close to the top dead center.

A valve control apparatus of an engine according to an embodiment of the present disclosure is provided. The control apparatus may include a data detector configured to detect data related to a current running state of a vehicle, and an intake continuous variable valve duration (CVVD) apparatus configured to control an open duration of an intake valve. The valve control apparatus may further include an intake continuous variable valve timing (CVVT) apparatus configured to control the opening and closing timing (phase) of the intake valve, and an exhaust continuous variable valve duration (CVVD) apparatus configured to control an open duration of an exhaust valve. Furthermore, the valve control apparatus may include an exhaust continuous variable valve timing (CVVT) apparatus configured to control the opening and closing timing (phase) of the exhaust valve. In addition, the valve control apparatus may include a controller configured to: determine the current driving region among a predetermined plurality of driving regions according to a speed and a torque of the engine based on a signal of the data detector; control operations of the intake CVVD apparatus, the intake CVVT apparatus, the exhaust CVVD apparatus, and the exhaust CVVT apparatus according to the determined current driving region; and control the intake valve closing (IVC) timing to before a bottom dead center (BDC) in all driving regions.

The opening duration of the intake valve may be within 180 crank angle (CA) degrees in all driving regions.

When an operation state of the engine corresponds to a predetermined low torque region, the controller may control the operation of the intake CVVD apparatus, the intake CVVT apparatus, the exhaust CVVD apparatus, and the exhaust CVVT apparatus. The controller may also implement a predetermined reference intake valve closing (IVC) timing, a predetermined reference exhaust valve opening (EVO) timing, the intake valve duration to a predetermined reference intake duration, and the exhaust valve duration to a predetermined reference exhaust duration. The predetermined reference exhaust valve opening (EVO) timing may be at 180 CA degrees before a top dead center (TDC).

The controller may output a control signal that limits the overlap of the intake and exhaust valves.

When an operation state of the engine corresponds to a predetermined low-medium speed and medium torque region, the controller may output a control signal to increase the exhaust valve duration rather than a predetermined reference exhaust valve duration.

When an operation state of the engine corresponds to a predetermined medium-high speed and medium torque region, the controller may output a signal to retard the intake valve closing (IVC) timing rather than a predetermined reference intake valve closing (IVC) timing. The controller may also output a signal to increase the intake valve duration rather than the predetermined reference intake duration. Additionally, the controller may output a signal to advance the exhaust valve opening (EVO) timing rather than a predetermined reference exhaust valve opening (EVO) timing. Furthermore, the controller may output a control signal to increase the exhaust valve duration rather than a predetermined reference exhaust duration.

When an operating state of the engine corresponds to a predetermined low speed and high torque region, the controller may output a control signal to reduce the exhaust valve duration rather than a predetermined reference exhaust duration. The controller may also output a control signal to retard the intake valve closing (IVC) timing rather than a predetermined reference intake valve closing (IVC) timing. The controller may also output a control signal so that the exhaust valve opening (EVO) timing is after the bottom dead center. Additionally, the controller may output a control signal so that the intake valve closing timing (IVC) approaches the bottom dead center.

The controller may output a control signal to perform a predetermined short valve overlap that utilizes scavenging.

When an operation state of the engine corresponds to a predetermined medium-high speed and high torque region, the controller may output a control signal that delays the intake valve closing (IVC) timing from a predetermined reference intake valve closing (IVC) timing to avoid knocking. Furthermore, the controller may output a control signal for limiting overlap so that scavenging does not occur.

The controller may output a control signal so that the exhaust valve opening (EVO) timing is before the bottom dead center, and the controller may output a control signal such that the intake valve closing timing (IVC) is retarded than the reference intake valve closing (IVC) timing.

The controller may output a control signal so that an intake valve opening timing (IVO) and an exhaust valve closing (EVC) timing are close to the top dead center.

As described above, according to an embodiment of the present disclosure, optimum control can be implemented in various engine operation conditions by controlling the duration of the continuous variable valve and the timing of the continuous variable valve.

By optimally controlling the opening and closing timing of intake and exhaust valves, pumping loss can be reduced, and fuel efficiency can be improved under partial torque conditions. Furthermore, engine performance can be improved under high torque conditions.

In addition, according to an embodiment of the present disclosure, it is possible to secure sufficient low-end torque in a low speed and high torque region, so that a turbocharger can be driven more effectively.

In addition, according to an embodiment of the present disclosure, knocking can be suppressed by applying the turbocharger's maximum supercharging effect and exhaustive intake valve closing (EIVC) effect in a high-speed high torque region.

BRIEF DESCRIPTION OF THE DRAWINGS

Since these drawings are for reference in explaining embodiments of the present disclosure, the technical idea of the present disclosure should not be construed as limited to the accompanying drawings.

DETAILED DESCRIPTION

Figure 1:
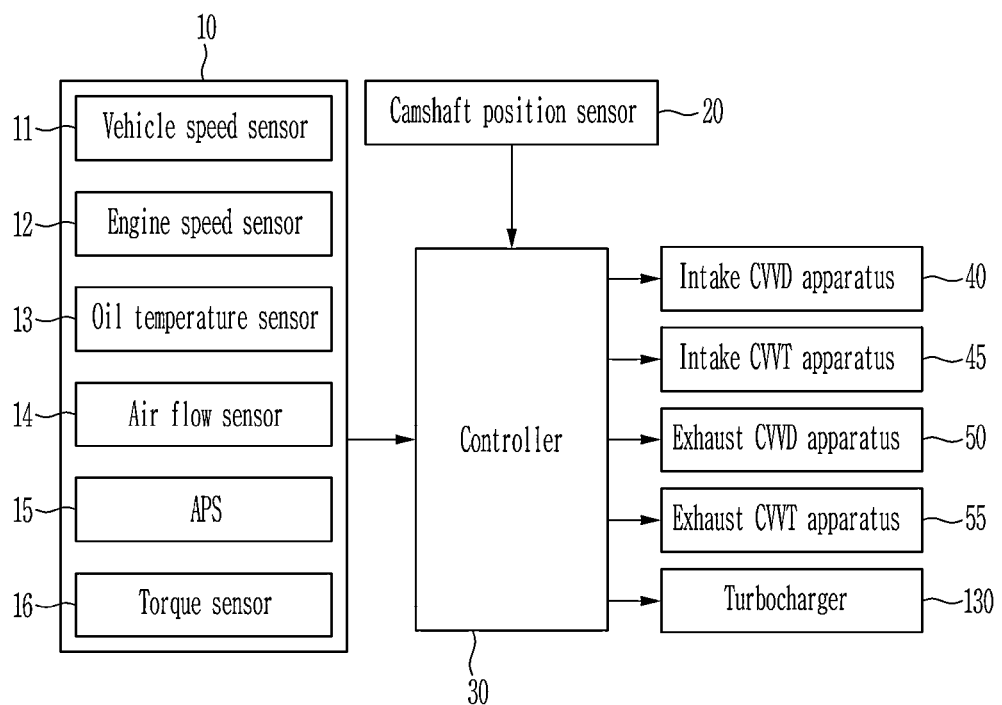
FIG. 1 is a block diagram of a valve opening and closing control apparatus of an engine according to an embodiment of the present disclosure.

In the following detailed description, only certain embodiments of the present disclosure have been shown and described, simply by way of illustration.

As those having ordinary skill in the art would realize, the described embodiments may be modified in various different ways, all without departing from the spirit or scope of the present disclosure.

Throughout the specification, when a certain component is said to "include," it means that it may further include other components without excluding other components unless otherwise stated.

When a component, device, element, or the like of the present disclosure is described as having a purpose or performing an operation, function, or the like, the component, device, or element should be considered herein as being "configured to" meet that purpose or perform that operation or function.

Parts designated with like reference numerals throughout the specification mean like elements.

As used herein, the terms "car," "vehicle," "vehicular," "automobile," or other similar terms as used herein are inclusive of motor vehicles in general. Such motor vehicles may encompass passenger automobiles including sports utility vehicles (SUVs), buses, trucks, various commercial vehicles, passenger cars, and hybrid vehicles. Such motor vehicles may also include plug-in hybrid electric vehicles, hydrogen-fueled vehicles, and other alternative fuel vehicles (e.g., fuels derived from sources other than petroleum). As referred to herein, a hybrid vehicle is a vehicle that has two or more sources of power, for example vehicles that are powered by both gasoline and electricity.

Additionally, some methods may be executed by at least one controller.

The term controller refers to a hardware apparatus that contains memory and a processor designed to execute at least one step that translates into an algorithm structure.

The memory is intended to store algorithm steps, and the processor is specifically designed to execute the algorithm steps in order to perform at least one of the processes described below.

Furthermore, the control logic of the present disclosure may be implemented in a non-transitory computer-readable medium on a computer-readable medium containing executable program instructions executed by a processor, controller, or the like.

Examples of computer readable means include, but are not limited to, read-only memory (ROM), random access memory (RAM), compact disc read-only memory (CD-ROM), magnetic tape, floppy disk, flash drive, smart card, and optical data storage apparatus.

Reproduction media readable by a computer may be distributed to computer systems connected to a network and stored and executed in a distributed manner by, for example, a telematics server or CAN (Controller Area Network).

An embodiment of the present disclosure is hereinafter described in detail with reference to the accompanying drawings.

FIG. 1 is a block diagram of a valve opening and closing control apparatus of an engine according to an embodiment of the present disclosure.

As shown in FIG. 1, the valve opening and closing control apparatus of the engine according to an embodiment of the present disclosure includes a data detector 10, a camshaft position sensor 20, and a controller 30. The valve opening and closing apparatus also includes an intake continuous variable valve duration (CVVD) apparatus 40, an intake continuous variable valve timing (CVVT) apparatus 45, an exhaust continuous variable valve duration (CVVD) apparatus 50, and an exhaust continuous variable valve timing (CVVT) apparatus 55.

The data detector 10 detects data related to the current running state of the vehicle in order to control the continuous variable valve duration apparatus and continuous variable valve timing apparatus provided in the intake and exhaust. Additionally, the data detector 10 may include a vehicle speed sensor 11, an engine speed sensor 12, an oil temperature sensor 13, an air flow sensor 14, an accelerator pedal position sensor (APS) 15 and a torque sensor 16.

The vehicle speed sensor 11 detects the speed of the vehicle and transmits a corresponding signal to the controller 30. The vehicle speed sensor 11 can be mounted on a wheel of the vehicle and so on, for example.

The engine speed sensor 12 detects the speed of the engine according to the phase change of the crankshaft or camshaft and transmits a corresponding signal to the controller 30.

The oil temperature sensor (OTS) 13 may detect oil temperature, for example, the temperature of oil flowing through an oil control valve (OCV). The OTS 13 may also transmit a corresponding signal to the controller 30.

The oil temperature may be predicted by measuring the coolant temperature that cools the engine using a coolant temperature sensor mounted on the coolant passage of an intake manifold.

Therefore, in this specification and the claims, it should be understood that the oil temperature sensor 13 includes the coolant temperature sensor, and the oil temperature includes the coolant temperature.

The air flow sensor 14 detects the amount of air inflow to the intake manifold and transmits a corresponding signal to the controller 30.

The accelerator pedal position sensor (APS) 15 detects the degree to which the driver presses (i.e., actuates) the accelerator pedal.

When the accelerator pedal is completely pressed, the position value of the accelerator pedal may be 100%. Furthermore, when the accelerator pedal is not pressed, the position value of the accelerator pedal may be 0%.

The accelerator pedal position sensor 15 may be replaced with a throttle valve opening degree sensor (TPS) mounted in the intake passage instead of the APS.

Therefore, it should be understood that in this present specification and claims, the accelerator pedal position sensor 15 includes the throttle valve opening degree sensor. Additionally, the accelerator pedal position value includes the throttle valve opening degree.

The torque sensor 16 measures the torque of, for example, a crankshaft, and the like. The torque sensor 16 transmits a corresponding signal to the controller 30.

The camshaft position sensor 20 detects the angle change of the camshaft and transmits a corresponding signal to the controller 30.

An engine to which a control method according to an embodiment of the present disclosure may be applied may further include a turbocharger 130.

The controller 30 may control the operation of the turbocharger 130 according to the output signal of the data detector 10 and the camshaft position sensor 20.

For example, the turbo charger 130 may include a waste gate, and the controller 30 may open and close the waste gate according to output signals of the data detector 10 and the camshaft position sensor 20.

Since the configuration and operation of the turbo charger 130 should be apparent to those having ordinary skill in the art, a detailed description thereof is omitted.

Figure 2:
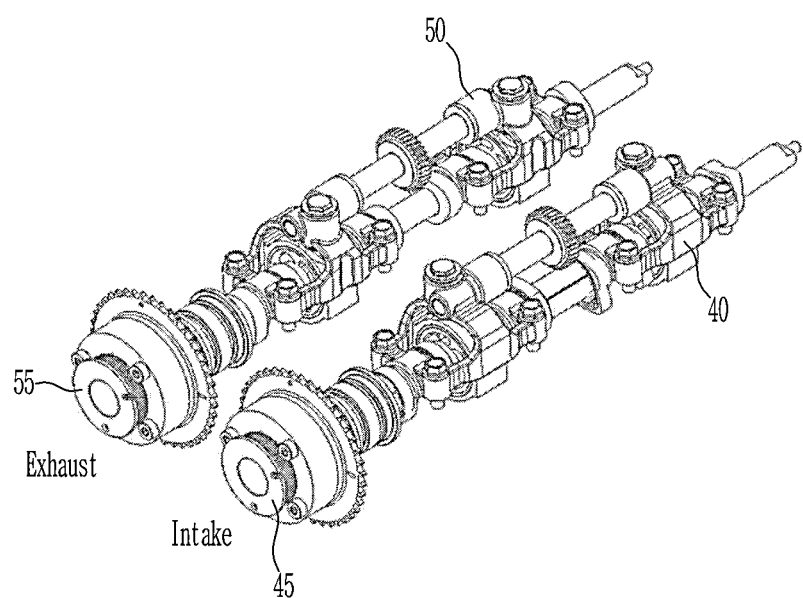
FIG. 2 is a perspective view of a continuous variable valve duration apparatus and a continuous variable valve timing apparatus that may be applied to an engine according to an embodiment of the present disclosure.

FIG. 2 is a perspective view of a continuous variable valve duration apparatus and a continuous variable valve timing apparatus that may be applied to an engine according to an embodiment of the present disclosure.

As shown in FIG. 2, in an embodiment of the present disclosure, in the intake, the intake continuous variable valve duration apparatus 40 and the intake continuous variable valve timing apparatus 45 are mounted. Furthermore, as shown in FIG. 2, in the exhaust, the exhaust continuous variable valve duration apparatus 50 and the exhaust continuous variable valve timing apparatus 55 are mounted.

The intake continuous variable valve duration (CVVD) apparatus 40 adjusts the intake valve open duration of the engine according to the signal of the controller 30.

The intake continuous variable valve timing (CVVT) apparatus 45 controls the opening and closing timing (phase) of the intake valve of the engine according to the signal of the controller 30.

The exhaust continuous variable valve duration (CVVD) apparatus 50 controls the exhaust valve open duration of the engine according to the signal from the controller 30.

The exhaust continuous variable valve timing (CVVT) apparatus 55 controls the opening and closing timing (shifting phase) of the exhaust valve of the engine according to the signal from the controller 30.

The controller 30 determines which driving region of a predetermined plurality of driving regions corresponds to the operation state of the engine according to the engine speed and torque signal of the data detector 10. The controller 30 also controls the operation of the intake CVVD apparatus 40, the intake CVVT apparatus 45, the exhaust CVVD apparatus 50, and the exhaust CVVT apparatus 55 according to a corresponding driving region.

Figure 3:
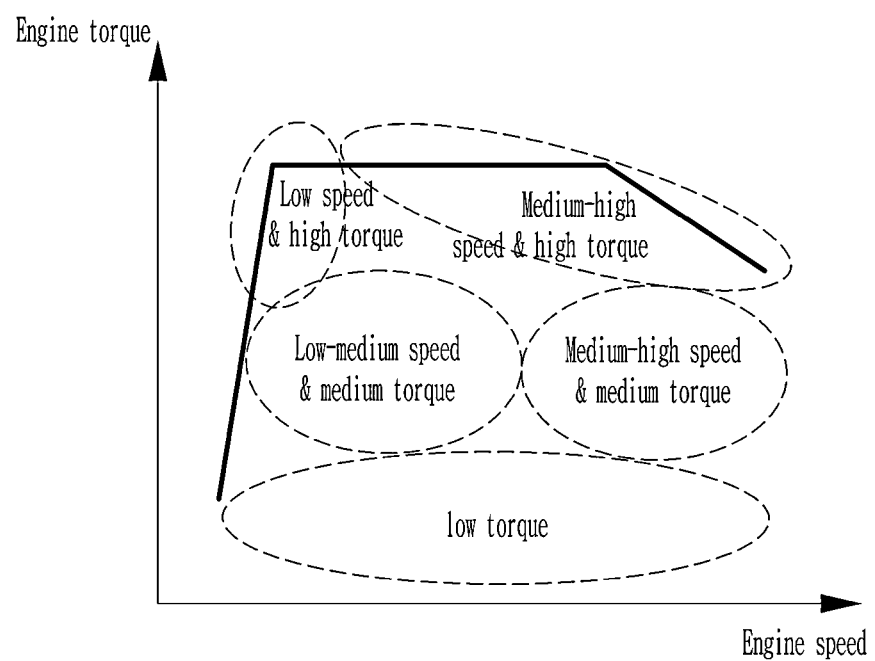
FIG. 3 is a drawing showing an operating area to which the valve opening and closing control method of an engine according to an embodiment of the present disclosure may be applied.

FIG. 3 is a drawing showing an operating area to which the valve opening and closing control method of an engine according to an embodiment of the present disclosure may be applied.

The plurality of driving regions may include a low torque region, a low-medium speed and medium torque region, a medium-high speed and medium torque region, a low speed and high torque region, and a medium-high speed and high torque region.

For convenience of understanding, five driving regions are shown in FIG. 3, but it is not limited thereto. Various types of driving regions may be set in advance in consideration of engine size, engine type, driving region, and the like.

The low torque region may be defined as a low torque state of the engine. The low-medium speed and medium torque region may be defined as a low-medium speed and medium torque state of the engine. The medium-high speed and medium torque region may be defined as a the medium-high speed and medium torque state of the engine, The low speed and high torque region may be defined as a low speed and high torque state of the engine. The medium-high speed and high torque region may be defined as a medium-high speed and high torque state of the engine.

The low speed, medium speed, and high speed of the engine and the low torque, medium torque, and high torque of the engine are relative definitions and may appear in various forms depending on the specifications of the engine.

The controller 30 controls the opening and closing timing and duration of each intake valve and exhaust valve according to the current driving region of the engine.

The intake valve closing (IVC) timing may be before the bottom dead center (BDC) in the entire driving region.

In the Detailed Description and Claims of the present disclosure, the valve opening and closing criterion means a predetermined position that allows a certain gap between the valve seat surface on the bottom of the cylinder head and the valve.

In other words, the valve opening and closing criterion does not mean the contact moment between the valve and the valve seat, but the valve position at the moment when actual intake and exhaust are allowed.

In the valve opening and closing control method of an engine according to an embodiment of the present disclosure, the intake valve closing (IVC) timing is always before the bottom dead center (BDC). Additionally, in the valve opening and closing control method of an engine according to an embodiment of the present disclosure, the Miller cycle may be implemented.

In other words, the engine to which the valve opening and closing control method of the engine according to an embodiment of the present disclosure is applied may implement the Miller cycle. The Miller cycle may be implemented by using the continuous variable valve duration apparatus and the continuous variable valve timing apparatus without any engine modification.

The Miller cycle can provide relatively improved heat efficiency by providing a higher expansion ratio than a compression ratio.

The opening duration of the intake valve may be less than a crank angle (CA) of 180 degrees in all driving regions.

In the valve opening and closing control method of an engine according to an embodiment of the present disclosure, the opening duration of the intake valve is limited to within a crank angle of 180 degrees, providing a relatively low compression ratio and the Miller cycle can be implemented in all driving regions.

Particularly, resistance to knocking can be increased by preventing the intake inertial effect in the high-speed driving region.

The controller 30 may be implemented as one or more processors operated by a set program. The set program may be programmed to perform each step of the valve timing control method of the continuous variable valve duration engine according to an embodiment of the present disclosure.

Various embodiments described herein may be embodied in a recording medium readable by a computer or a similar apparatus using, for example, software, hardware, or a combination thereof.

According to the hardware implementation, the embodiment described herein may be implemented using at least one of ASICs (application specific integrated circuits), DSPs (digital signal processors), DSPDs (digital signal processing devices), PLDs (programmable logic devices), FPGAs (field programmable gate arrays, processors, controllers, microcontrollers, microprocessors, and electrical units for performing other functions.

According to software implementation, embodiments such as procedures and functions described in this specification may be implemented as separate software modules.

Each of the software modules may perform at least one function and operation described in this specification.

Software code may be implemented as a software application written in an appropriate programming language.

Figure 4:
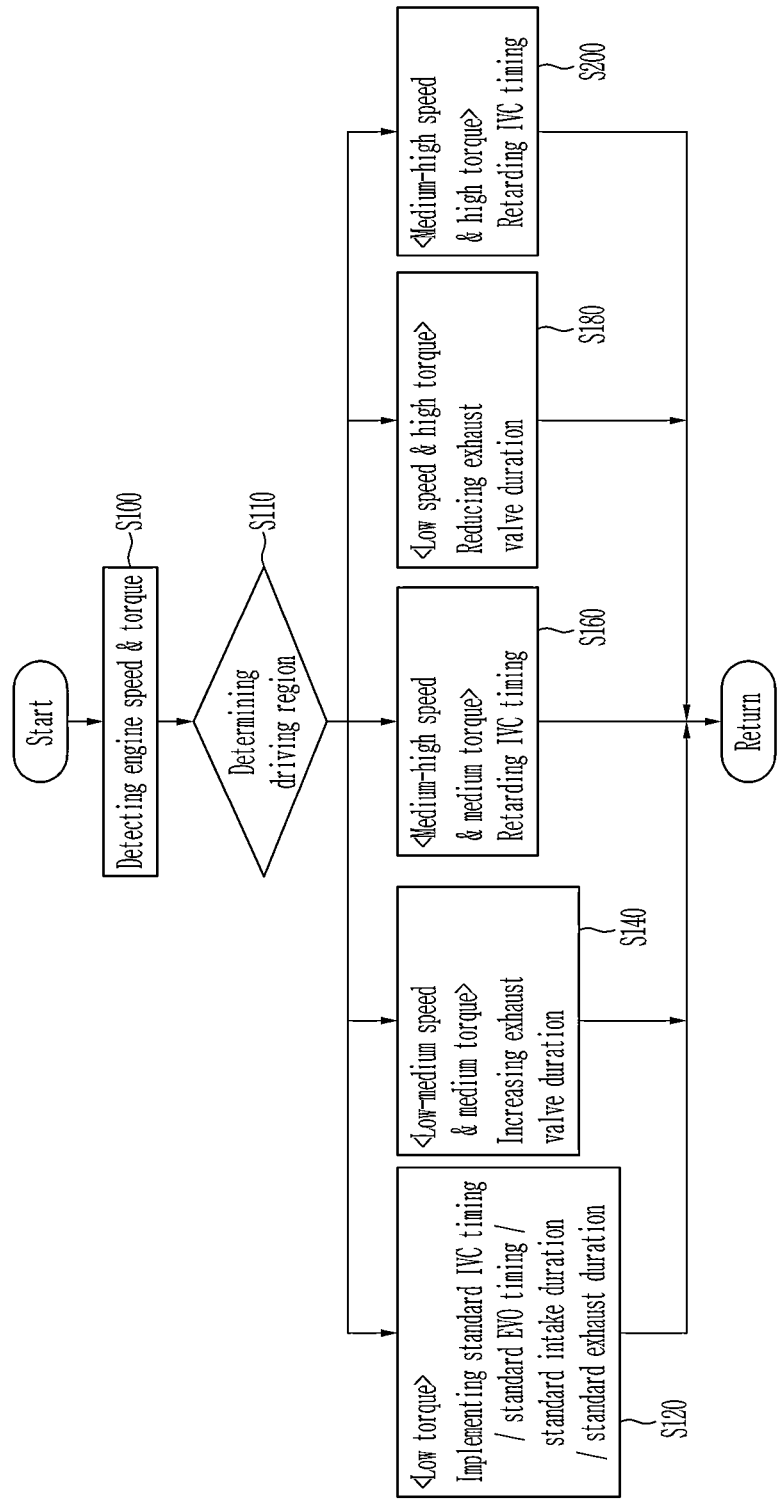
FIG. 4 is a flowchart showing the valve opening and closing control method of the engine according to an embodiment of the present disclosure.

FIG. 4 is a flowchart showing the valve opening and closing control method of the engine according to an embodiment of the present disclosure.

Figure 5A:
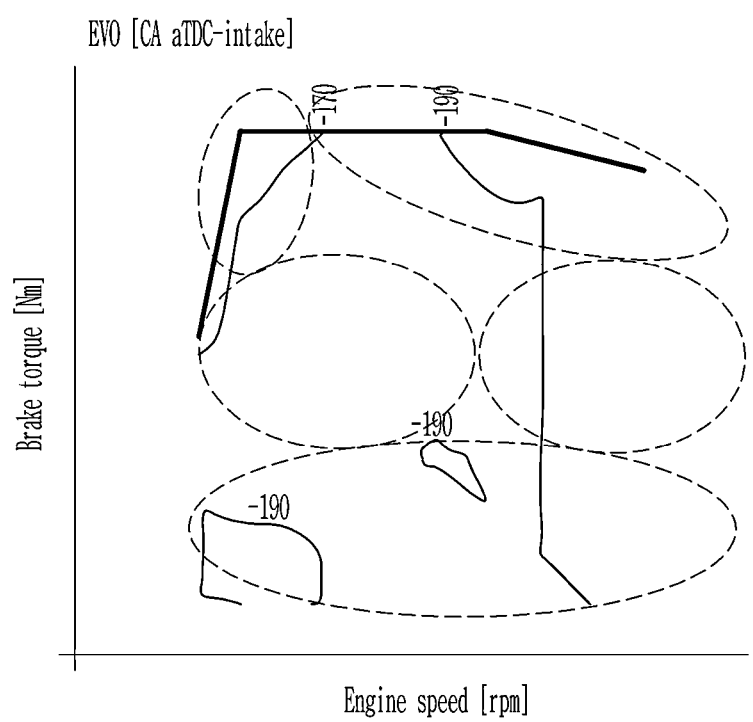
FIGS. 5A and 5B are graphs showing the exhaust valve opening and closing timing of the engine to which the valve opening and closing control method of the engine according to an embodiment of the present disclosure is applied.
Figure 5B:
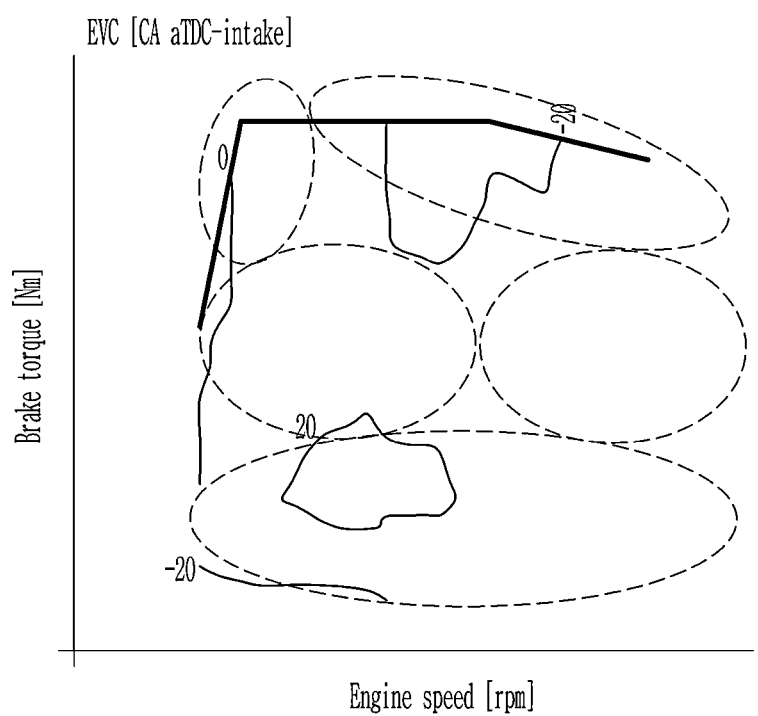
Figure 6A:
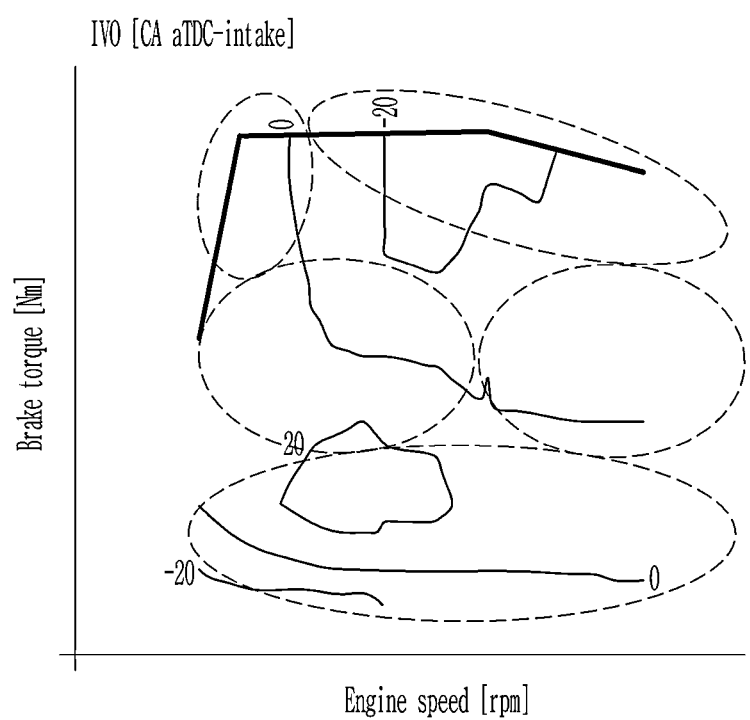
FIGS. 6A and 6B are graphs showing the opening and closing timing of the intake valve of the engine to which the valve opening and closing control method of the engine according to an embodiment of the present disclosure is applied.
Figure 6B:
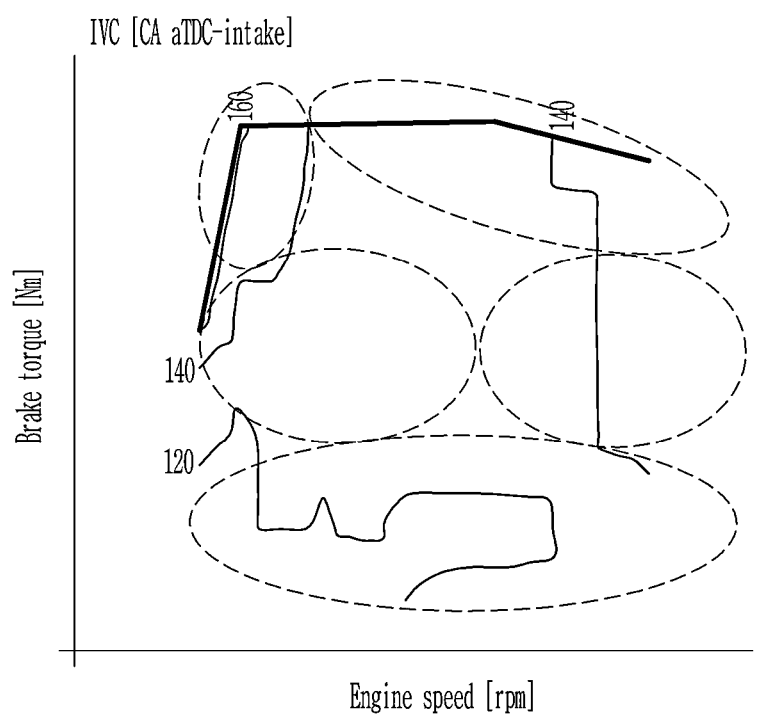

FIGS. 5A and 5B are a graphs showing the exhaust valve opening and closing timing of the engine to which the valve opening and closing control method of the engine according to an embodiment of the present disclosure is applied. FIGS. 6A and 6B are graphs showing the opening and closing timing of the intake valve of the engine to which the valve opening and closing control method of the engine according to an embodiment of the present disclosure is applied.

Figure 7:
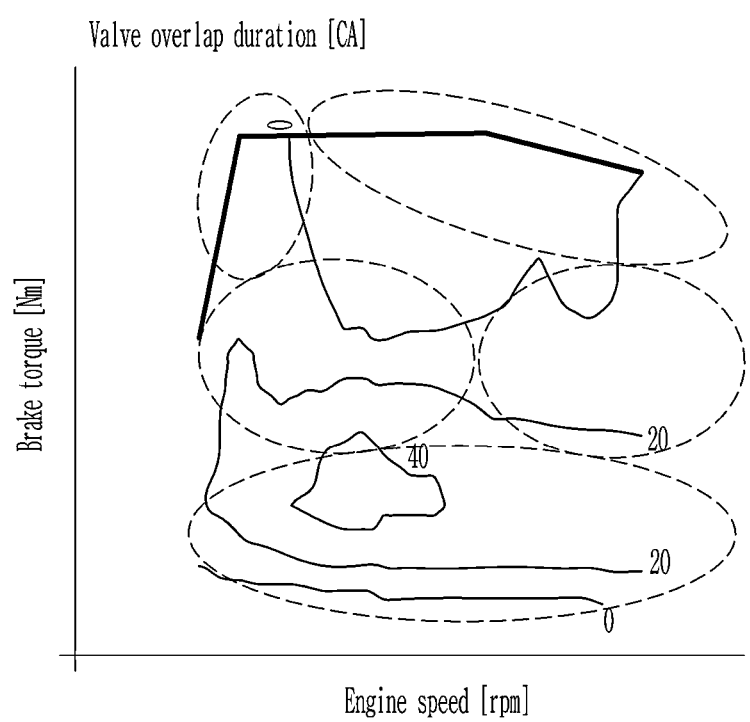
FIG. 7 is a graph showing an overlap of the intake valve and exhaust valve of an engine to which the valve opening and closing control method of the engine according to an embodiment of the present disclosure is applied.

FIG. 7 is a graph showing an overlap of the intake valve and exhaust valve of an engine to which the valve opening and closing control method of the engine according to an embodiment of the present disclosure is applied.

Figure 8A:
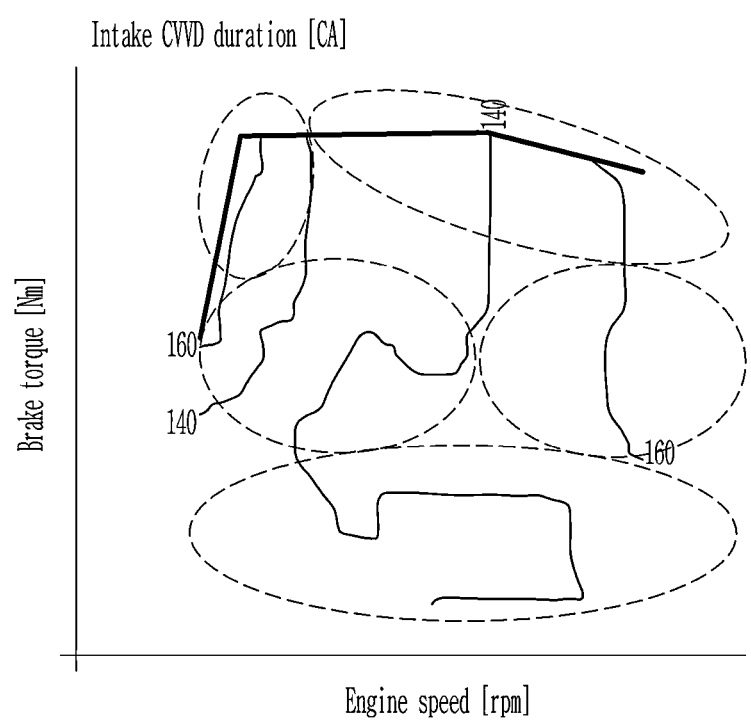
FIGS. 8A and 8B are graphs showing the valve duration of the intake valve and exhaust valve of the engine to which the valve opening and closing control method of an engine according to an embodiment of the present disclosure is applied.
Figure 8B:
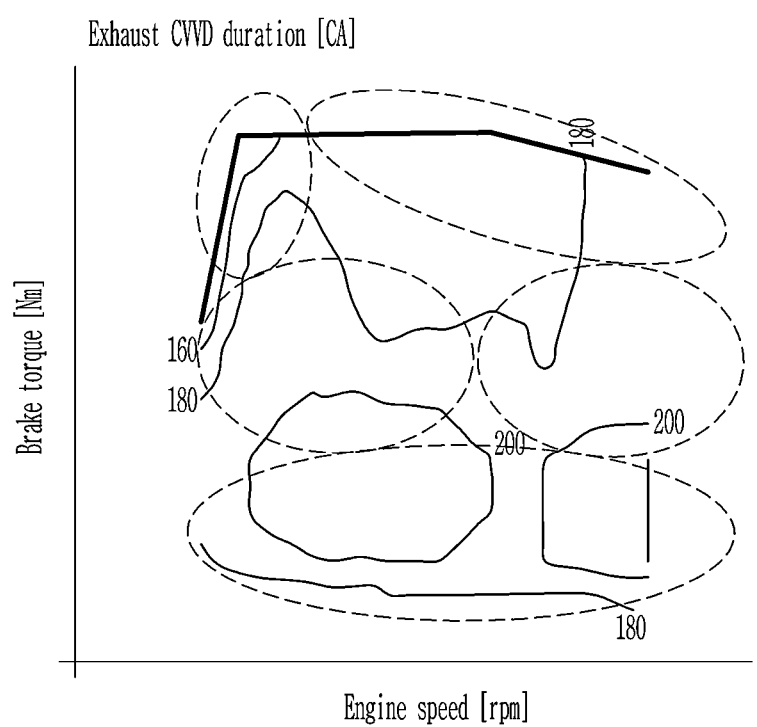
Figure 9A:
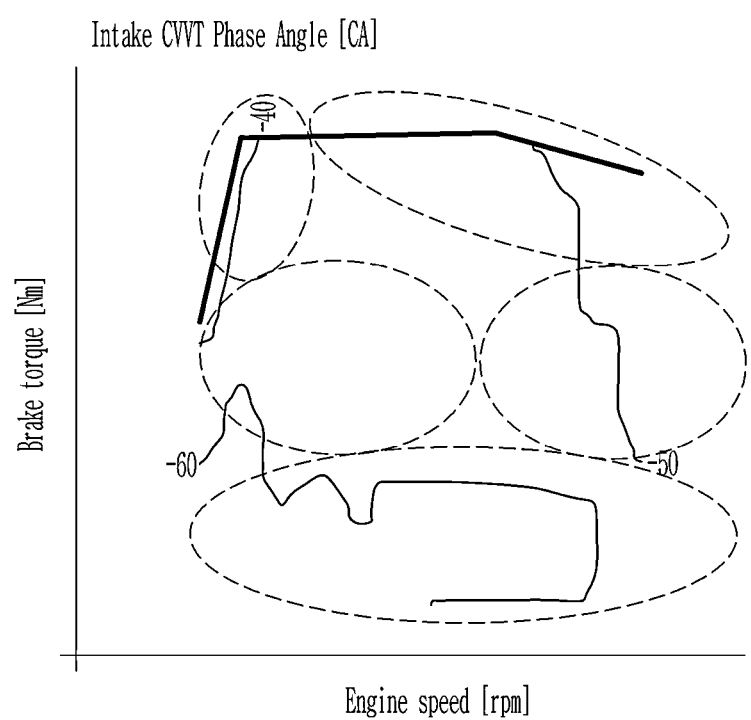
FIGS. 9A and 9B are graphs showing the operation angle of the continuous variable valve timing apparatus of the intake valve and the exhaust valve of the engine to which the valve opening and closing control method of the engine according to an embodiment of the present disclosure is applied.
Figure 9B:
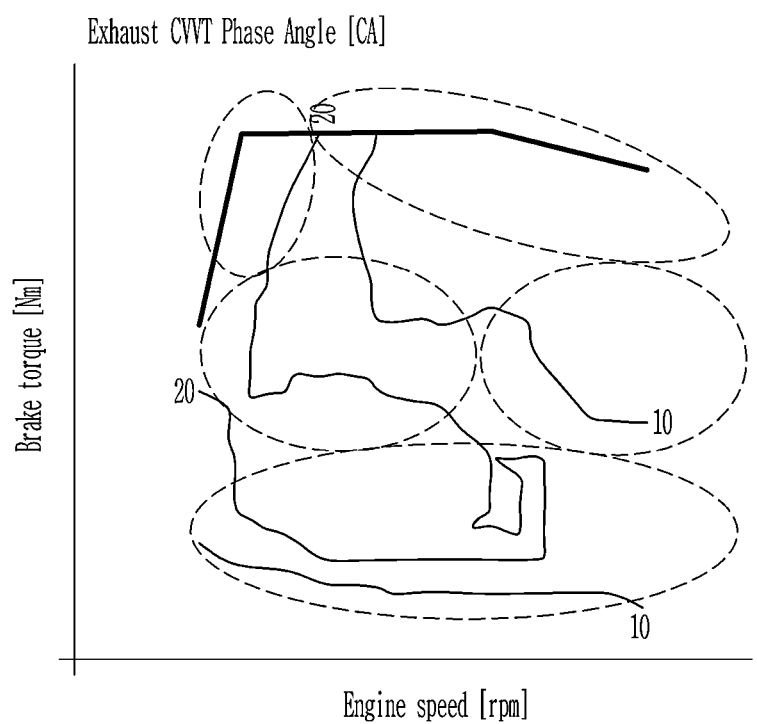

FIGS. 8A and 8B are graphs showing the valve duration of the intake valve and exhaust valve of the engine to which the valve opening and closing control method of an engine according to an embodiment of the present disclosure is applied. FIGS. 9A and 9B are graphs showing the operation angle of the continuous variable valve timing apparatus of the intake valve and the exhaust valve of the engine to which the valve opening and closing control method of the engine according to an embodiment of the present disclosure is applied.

In FIGS. 5A and 5B, EVO and EVC mean the opening and closing time of the exhaust valve. Additionally, based on the top dead center (TDC), the negative value means before the top dead center (TDC) and the positive value means after the top dead center (TDC).

In FIGS. 6A and 6B, IVO and IVC mean the opening and closing time of the intake valve. Additionally, based on the top dead center (TDC), a negative value means before the top dead center (TDC) and a positive value means after the top dead center (TDC).

In FIG. 7, the valve overlap duration is the amount of overlap between the intake valve and the exhaust valve expressed as crank angle (CA).

FIGS. 8A and 8B show the valve durations of the intake valve and exhaust valve by the operation of the intake continuous variable valve duration apparatus and the exhaust continuous variable valve duration apparatus 50.

FIGS. 9A and 9B show the valve timing (phase) expressed as crank angle (CA) based on the top dead center (TDC) by the operation of the intake continuous variable valve timing apparatus 45 and the exhaust continuous variable valve timing apparatus 55.

Referring to FIG. 4, the valve opening and closing control method of an engine according to an embodiment of the present disclosure includes a step S100. At step S100 the data detector 10 detects data related to the current running state of the vehicle and outputs a corresponding signal.

At step S110, the controller 30 determines which driving region the operation state of the engine corresponds to in a predetermined plurality of driving regions according to the output signal of the data detector 10.

For example, at step S110, the controller 30 determines which driving region among a predetermined plurality of driving regions corresponds to the current operation state of the engine according to the detected current engine speed and torque signal.

The controller 30 may set the driving region to a low torque region if the engine torque is less than a first predetermined torque. The controller 30 may also set the driving region to a low-medium speed and medium torque region if the engine speed is less than or equal to a first predetermined speed, and the engine torque exceeds the first predetermined torque and is less than a second predetermined torque. Furthermore, the controller 30 may set the driving region to a medium-high speed and medium torque region if the engine speed exceeds the first predetermined speed and the engine torque exceeds the first predetermined torque and is less than or equal to the second predetermined torque.

In addition, the controller 30 may set the driving region to a low speed and high torque region if the engine speed is less than a second predetermined speed and the engine torque exceeds the second predetermined torque. The controller 30 may also set the driving region to a medium-high speed and high torque region if the engine speed exceeds the second predetermined speed and the engine torque exceeds the second predetermined torque.

The first predetermined torque, the second predetermined torque, the first predetermined speed, and the second predetermined speed are classified for explanation and shown in the drawings. The torque and speed characteristics can be set in various ranges depending on engine specifications, region of use, and the like.

Setting the first predetermined torque, the second predetermined torque, the first predetermined speed, and the second predetermined speed is apparent to those having ordinary skill in the art, so a detailed description thereof is omitted.

The controller 30 determines which driving region among a predetermined plurality of driving regions the operation state of the engine corresponds to according to the current speed and torque signal of the engine of the data detector 10 at the step S110. Furthermore, the controller 30 controls the operation of the intake CVVD apparatus 40, the intake CVVT apparatus 45, the exhaust CVVD apparatus 50, and the exhaust CVVT apparatus 55 according to the corresponding driving region S120, S140, S160, S180, and S200.

In other words, the controller 30 controls the opening timing, closing timing, and duration of each intake valve and exhaust valve according to the driving region of the current engine.

As described above, the intake valve closing (IVC) timing may be before the bottom dead center (BDC) in all driving regions.

In other words, the timing of the intake valve closing (IVC) is always before the bottom dead center (BDC). Additionally, the Miller cycle can be implemented to provide improved heat efficiency through an expansion ratio that is relatively higher than the compression ratio.

In addition, the opening duration of the intake valve may be within a crank angle of 180 degrees in all driving regions. Through this, a relatively low compression ratio is provided and a Miller cycle can be implemented in all driving regions.

Particularly, resistance to knocking can be increased by preventing the intake inertial effect in the high-speed driving region.

In step S110, if the driving region according to the current engine state is the low torque region, then the controller 30 at step S120 controls the operation of the intake CVVD apparatus 40, the intake CVVT apparatus 45, the exhaust CVVD apparatus 50, and the exhaust CVVT apparatus 55. The controller 30 also implements a predetermined reference intake valve closing (IVC) timing, a predetermined reference exhaust valve opening (EVO) timing, the intake valve duration to a predetermined reference intake duration, and the exhaust valve duration to a predetermined reference exhaust duration at step S120.

The controller 30 outputs a control signal to the operation of the intake continuous variable valve duration apparatus 40 and the exhaust continuous variable valve duration apparatus 50 so that overlap between the intake valve and the exhaust valve does not occur.

In other words, the controller 30 outputs a control signal to limit overlap so as to secure combustion stability by limiting the amount of internal exhaust gas recirculation (EGR) in a low torque state.

In the low torque region, the exhaust flow rate is low, and the predetermined reference exhaust valve opening (EVO) timing, as shown in FIG. 5A, may be near the bottom dead center (BDC).

In other words, the reference exhaust valve opening (EVO) timing may be at a crank angle of 180 degrees before the top dead center (TDC). For example, the EVO timing may be in a CA range of −210 to −180 degrees after top dead center (aTDC).

Also, as shown in FIG. 6B, the predetermined reference intake valve closing (IVC) timing may be in a CA range of 110 to 130 degrees aTDC.

Referring to FIG. 8A, a relatively short intake duration (CA range of 130-150 degrees) is applied so that the intake valve closing (IVC) is relatively advanced (CA range of 110-130 degrees aTDC). Referring to FIG. 8B, a relatively short exhaust duration (CA range of 160-210 degrees) may be applied to limit valve overlap.

In the step S110, if the driving region according to the current engine state is a low-medium speed and medium torque region, the exhaust valve duration is increased from the reference exhaust valve duration S140.

For example, in the low-medium speed and medium torque region, the exhaust valve duration may be controlled to be in a CA range of 180-220 degrees.

The numerical comparison of the exhaust duration in the low torque region and the exhaust valve duration in the low-medium speed and medium torque region (CA range of 160-210 degrees and 180-220 degrees) shows the tendency of the exhaust duration for better comprehension and it is not limited to numerical values.

In the low-medium speed and medium torque region, the Miller cycle and EGR may be maximized.

In other words, combust stability is naturally achieved at low-medium speed and medium torque, and the Miller cycle's EIVC (Early Intake Valve Closing) strategy may be actively utilized.

Since the torque relatively increases compared to the low torque region, the low-medium speed and medium torque region has excellent combust stability, and the internal EGR may be additionally utilized compared to the low torque region.

In the low-medium speed and medium torque region, it is possible to secure the internal EGR by increasing valve overlap and reducing engine pumping loss.

A relatively short intake duration (CA range of 130-150 degrees) is applied to maintain the relative advance (CA range of 110-130 degrees aTDC) of the intake valve closing (IVC), and the exhaust duration is relatively increased (CA 180-220 degrees) to increase valve overlap.

The low-medium speed and medium torque region is a relatively low speed region, where exhaust valve opening (EVO) occurs near the bottom dead center (BDC) (CA range of −210 to −180 degrees aTDC).

In step S110, if the driving region according to the current engine state is determined to be a medium-high speed and medium torque region, the controller at S160 outputs a control signal so that the intake valve closing (IVC) timing is retarded (i.e., delayed). Specifically, the controller 30 delays the IVC timing rather than the predetermined reference intake valve closing (IVC) timing (S160) by controlling operations of the intake continuous variable valve duration apparatus 40 and the intake continuous variable valve timing apparatus 45.

For example, in the high-speed medium torque region, the controller 30 controls the intake valve closing (IVC) timing to a CA range of 130-150 degrees aTDC.

As an example, the intake valve closing (IVC) timing (CA in a range of 110-130 degrees aTDC) in the low torque region and the intake valve closing (IVC) timing (CA in a range of 130-150 degrees aTDC) in the medium-high speed and medium torque region are given for better comprehension, and to show the trend of the control system. It is important to note that the values are not limited to each figure.

If the driving region is a medium-high speed and medium torque region, the controller 30 outputs a control signal so that the intake valve duration is relatively increased rather than the predetermined reference intake valve duration. Additionally, the controller 30 outputs a control signal so that the exhaust valve open (EVO) timing advances from the reference exhaust valve open (EVO) timing by controlling the operation of the intake continuous variable valve duration apparatus 40.

In the medium-high speed and medium torque region, a strategy to maximize thermal efficiency is used. The intake valve closing (IVC) is retarded to increase the effective compression ratio of the combustion chamber, and the thermal efficiency can be increased by compressing the mixture.

In other words, it is possible to secure resistance against knocking by increasing the engine speed compared to the low-medium speed and medium torque region.

The intake pressure reduced by the retard of intake valve closing (IVC) can be compensated by increasing the internal EGR, and at this time, losses due to engine pumping can be reduced.

In the medium-high speed and medium torque region, the intake valve closing (IVC) timing is retarded to a certain level (CA range of 130~150 degrees aTDC) from the maximum advanced timing. Thus, compared to the low-medium speed and medium torque region, the intake duration may be relatively increased (CA range of 130~170 degrees).

Furthermore, in the medium-high speed and medium torque region, an increase in intake exhaust valve overlap is required for the addition of internal EGR. However, a change in exhaust duration may not be required due to an increase in intake duration.

In other words, in the medium-high speed and medium torque region, the exhaust duration may be equivalent (CA range of 180~220 degrees) to that of the low-medium speed and medium torque region.

In the low-medium speed and medium torque region, the exhaust valve opening (EVO) timing may be advanced (CA range of −220~−190 degrees aTDC) as the engine speed increases.

Each number presented as an example is for better comprehension. Furthermore, values represent the trend and are not limited to each number.

In step S110, if the driving region according to the current engine state is determined to be a low speed and high torque region, the controller 30 at S180 outputs a control signal to reduce the exhaust valve duration rather than the reference exhaust valve duration (S180) by controlling the operation of the continuous variable exhaust valve duration apparatus 50.

An engine to which the control method according to an embodiment of the present disclosure can be applied may further include a turbocharger 130. The turbo charger 130 is used to increase the turbo speed, which is desired in the low speed and high torque region.

In other words, in the low speed and high torque region, as a strategy to secure low-end torque, a short exhaust duration is applied to increase the exhaust pressure, thereby increasing the turbo speed.

In the low speed and high torque region, the controller 30 outputs a control signal so that the exhaust valve opening timing (EVO) is after the bottom dead center (CA range of −180 to −120 degrees aTDC), and outputs a control signal so that the intake valve closing timing (IVC) is close to the bottom dead center.

In the low speed and high torque region, the exhaust flow rate may become insufficient. Therefore, by applying a short exhaust duration, e.g., CA in a range of 130~170 degrees, it is possible to increase the back pressure in front of the turbine and increase the turbo speed.

Normal exhaust valve opening (EVO) timing can be in a CA range of −210 to −180 degrees aTDC, but in the low speed and high torque region, the exhaust valve opening (EVO) timing is delayed (CA range of −170 to −130 degrees aTDC).

Also, in the low speed and high torque region, the intake valve closing (IVC) timing is close to the bottom dead center (BDC) (CA range of 150~180 degrees aTDC) to secure sufficient intake air.

Also, referring to FIG. 7, in the low speed and high torque region, a predetermined short valve overlap (CA range of 0~20 degrees) that utilizes scavenging within the allowable limit of exhaust gas (EM) can be applied. Additionally, exhaust valve closing (EVC) and intake valve opening (IVO) can be determined considering the valve overlap.

In the step S110, if the driving region according to the current engine state is a medium-high speed and high torque region, the controller 30 outputs a control signal such that the intake valve closing (IVC) timing is retarded than the reference intake valve closing (IVC) timing to avoid knocking (S200).

In the medium-high speed and high torque region, a strategy is applied to maximize the supercharging of the turbocharger and avoid knocking using EIVC of the Miller cycle.

In other words, if the driving region is a medium-high speed and high torque region, the controller 30 outputs a control signal so that the exhaust valve opening timing (EVO) is before the bottom dead center (BDC), and the controller outputs a control signal so that the intake valve closing timing (IVC) to be before the bottom dead center.

In addition, if the driving region is a medium-high speed and high torque region, the controller 30 outputs a control signal so that the intake valve opening timing (IVO) and the exhaust valve closing timing (EVC) approach the top dead center (TDC).

In addition, if the driving region is a medium-high speed and high torque region, the controller 30 may control the waste gate of the turbocharger to be blocked within a range allowed by the speed margin.

For example, the wastegate of the turbocharger 130 may be completely closed within the limit allowed by the speed margin to maximize the supercharging of the turbocharger 130. Furthermore, if the supercharging of the turbocharger 130 is out of the limit allowed by the speed margin, the controller 30 may control the wastegate of the turbocharger 130 to be opened.

In the medium-high speed and high torque region of the driving region, exhaust valve opening (EVO) is advanced from the bottom dead center (BDC) for minimization of pumping loss due to back pressure. For example, as shown in FIG. 5A, the EVO is controlled by a crank angle range of −220 to −180 degrees aTDC, and the intake valve closing (IVC) timing for air volume and torque control, as shown in FIG. 6B, for example, can be controlled at a crank angle range of 130~170 degrees aTDC.

In the medium-high speed and high torque region, the effect of intake inertia at high speed is suppressed by applying early intake valve closing (EIVC), and it is effective in suppressing knocking.

Since scavenging is restricted due to the regulation of exhaust gas (EM), valve overlap is minimized.

In other words, the controller 30 performs overlap limit control so that scavenging does not occur.

With minimization of valve overlap, intake valve opening (IVO) and exhaust valve closing (EVC) may occur at almost the same timing (crank angle range of −30~10 degrees aTDC).

As described above, according to an embodiment of the present disclosure, optimal control may be implemented in various engine operation conditions by continuously and simultaneously controlling the duration of the valve and the timing of the valve (phase shifting).

According to the valve opening and closing control method for an engine and the control system for the same according to an embodiment of the present disclosure, combustion stability may be maintained in the low torque region.

According to the valve opening and closing control method for an engine and the control system for the same according to an embodiment of the present disclosure, it is possible to secure internal EGR and reduce engine pumping loss by increasing valve overlap in the low-medium speed and medium torque region.

According to the valve opening and closing control method for an engine and the control system for the same according to an embodiment of the present disclosure, the possibility of knocking is lowered in the medium-high speed and medium torque region, thereby increasing the compression ratio. Additionally, it is possible to increase thermal efficiency compared to low-medium speed and medium torque region.

According to the valve opening and closing control method for an engine and the control system for the same according to an embodiment of the present disclosure, turbo speed may be increased by securing low-end torque (LET) in the low speed and high torque region.

According to the valve opening and closing control method for an engine and the control system for the same according to an embodiment of the present disclosure, in the medium-high speed and high torque region, it is possible to maintain high torque characteristics while increasing fuel efficiency by actively utilizing the Miller cycle.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

| <Description of symbols> | |
|---|---|
| 10: data detector | 11: vehicle speed sensor |
| 12: engine speed sensor | 13: oil temperature sensor |
| 14: air flow sensor | 15: APS |
| 16: torque sensor | |
| 20: camshaft position sensor | |
| 30: controller | 40: intake CVVD apparatus |
| 45: intake CVVT apparatus | 50: exhaust CVVD apparatus |
| 55: exhaust CVVT apparatus | 130: turbocharger |

What is claimed is:

1. A control method of valve opening and closing for an engine, where an intake continuous variable valve duration (CVVD) apparatus and an intake continuous variable valve timing (CVVT) apparatus are provided in an intake side of the engine, and exhaust continuous variable valve duration (CVVD) apparatus and an exhaust continuous variable valve timing (CVVT) apparatus are provided in an exhaust side of the engine, the control method comprising:
   determining, by a controller, a driving region among a predetermined plurality of driving regions based on a speed and a torque of the engine; and
   controlling, by the controller, an opening timing, a closing timing, and an opening duration of each of an intake valve and an exhaust valve according to the driving region of the engine,
   wherein the intake valve closing (IVC) timing is between a top dead center (TDC) of a single crank rotation of the engine and a bottom dead center (BDC) of the single crank rotation of the engine in each of the plurality of driving regions, and
   wherein the opening duration of the intake valve is within 180 crank angle (CA) degrees in each of the plurality of driving regions.

2. The control method of claim 1, wherein
   when an operation state of the engine corresponds to a predetermined low torque region, the controller controls the operation of the intake CVVD apparatus, the intake CVVT apparatus, the exhaust CVVD apparatus, and the exhaust CVVT apparatus, and the controller implements a predetermined reference intake valve closing (IVC) timing, a predetermined reference exhaust valve opening (EVO) timing, the intake valve opening duration to a predetermined reference intake duration, and the exhaust valve opening duration to a predetermined reference exhaust duration.

3. The control method of claim 2, wherein
   the predetermined reference exhaust valve opening (EVO) timing is at a CA of 180 degrees before the TDC.

4. The control method of claim 2, wherein
   the controller outputs a control signal that limits overlap of the intake and exhaust valves.

5. The control method of claim 1, wherein
   when an operation state of the engine corresponds to a predetermined low-medium speed and medium torque region, the controller outputs a control signal to increase the exhaust valve opening duration rather than a predetermined reference exhaust valve duration.

6. The control method of claim 1, wherein
   when an operation state of the engine corresponds to a predetermined medium-high speed and medium torque region, the controller outputs a signal to retard the intake valve closing (IVC) timing rather than a predetermined reference intake valve closing (IVC) timing.

7. The control method of claim 6, wherein
   the controller outputs a signal to increase the intake valve opening duration rather than a predetermined reference intake duration.

8. The control method of claim 6, wherein
   the controller outputs a signal to advance the exhaust valve opening (EVO) timing rather than a predetermined reference exhaust valve opening (EVO) timing.

9. The control method of claim 6, wherein
   the controller outputs a control signal to increase the exhaust valve opening duration rather than a predetermined reference exhaust duration.

10. The control method of claim 1, wherein
    when an operating state of the engine corresponds to a predetermined low speed and high torque region, the controller outputs a control signal to reduce the exhaust valve opening duration rather than a predetermined reference exhaust duration.

11. The control method of claim 10, wherein
the controller outputs a control signal to retard the intake valve closing (IVC) timing rather than a predetermined reference intake valve closing (IVC) timing.

12. The control method of claim 10, wherein
the controller outputs a control signal so that the exhaust valve opening (EVO) timing is after the bottom dead center.

13. The control method of claim 10, wherein
the controller outputs a control signal so that the intake valve close timing (IVC) approaches the bottom dead center.

14. The control method of claim 10, wherein
the controller outputs a control signal to perform a predetermined short valve overlap that utilizes scavenging.

15. The control method of claim 1, wherein
when an operation state of the engine corresponds to a predetermined medium-high speed and high torque region, the controller outputs a control signal that delays the intake valve close (IVC) timing from a predetermined reference intake valve close (IVC) timing to avoid knocking.

16. The control method of claim 15, wherein
the controller outputs a control signal for limiting overlap so that scavenging does not occur.

17. The control method of claim 15, wherein
the controller outputs a control signal so that the exhaust valve opening (EVO) timing is before the bottom dead center.

18. The control method of claim 15, wherein
the controller outputs a control signal such that the intake valve closing timing (IVC) is retarded rather than the predetermined reference intake valve closing (IVC) timing.

19. The control method of claim 15, wherein
the controller outputs a control signal so that the intake valve opening timing (IVO) and the exhaust valve closing (EVC) timing are close to a top dead center.

20. A valve control apparatus of an engine, the control apparatus comprising:
 a data detector configured to detect data related to a current running state of a vehicle;
 an intake continuous variable valve duration (CVVD) apparatus configured to control an open duration of an intake valve;
 an intake continuous variable valve timing (CVVT) apparatus configured to control the opening and closing timing (phase) of the intake valve;
 an exhaust continuous variable valve duration (CVVD) apparatus configured to control an open duration of an exhaust valve;
 an exhaust continuous variable valve timing (CVVT) apparatus configured to control the opening and closing timing (phase) of the exhaust valve; and
 a controller configured to:
  determine the current driving region among a predetermined plurality of driving regions according to a speed and a torque of the engine based on a signal of the data detector;
  control operations of the intake CVVD apparatus, the intake CVVT apparatus, the exhaust CVVD apparatus, and the exhaust CVVT apparatus according to the driving region; and
  control the intake valve closing (IVC) timing to be between a top dead center (TDC) of a single crank rotation of the engine and a bottom dead center (BDC) of the single crank rotation of the engine in each of the plurality of driving regions,
 wherein the open duration of the intake valve is within a crank angle (CA) range of 180 degrees in each of the plurality of driving regions.

21. The control apparatus of claim 20, wherein
when an operation state of the engine corresponds to a predetermined low torque region, the controller controls the operation of the intake CVVD apparatus, the intake CVVT apparatus, the exhaust CVVD apparatus, and the exhaust CVVT apparatus, and the controller implements a predetermined reference intake valve closing (IVC) timing, a predetermined reference exhaust valve opening (EVO) timing, the intake valve open duration to a predetermined reference intake duration, and the exhaust valve open duration to a predetermined reference exhaust duration, and
the reference exhaust valve opening (EVO) timing is at a CA of 180 degrees before the TDC.

22. The control apparatus of claim 21, wherein
the controller outputs a control signal that limits overlap of the intake and exhaust valves.

23. The control apparatus of claim 20, wherein
when an operation state of the engine corresponds to a predetermined low-medium speed and medium torque region, the controller outputs a control signal to increase the exhaust valve open duration rather than a predetermined reference exhaust valve duration.

24. The control apparatus of claim 20, wherein
when an operation state of the engine corresponds to a predetermined medium-high speed and medium torque region,
the controller outputs a signal to retard the intake valve closing (IVC) timing rather than a predetermined reference intake valve closing (IVC) timing,
the controller outputs a signal to increase the intake valve open duration rather than a predetermined reference intake duration,
the controller outputs a signal to advance the exhaust valve opening (EVO) timing rather than a predetermined reference exhaust valve opening (EVO) timing, and
the controller outputs a control signal to increase the exhaust valve open duration rather than a predetermined reference exhaust duration.

25. The control apparatus of claim 20, wherein
when an operating state of the engine corresponds to a predetermined low speed and high torque region,
the controller outputs a control signal to reduce the exhaust valve open duration rather than a predetermined reference exhaust duration,
the controller outputs a control signal to retard the intake valve closing (IVC) timing rather than a predetermined reference intake valve closing (IVC) timing,
the controller outputs a control signal so that the exhaust valve opening (EVO) timing is after the bottom dead center, and
the controller outputs a control signal so that the intake valve closing timing (IVC) approaches the bottom dead center.

26. The control apparatus of claim 25, wherein
the controller outputs a control signal to perform a predetermined short valve overlap that utilizes scavenging.

27. The control apparatus of claim 20, wherein
when an operation state of the engine corresponds to a predetermined medium-high speed and high torque region, the controller outputs a control signal that delays the intake valve closing (IVC) timing from a predetermined reference intake valve closing (IVC) timing to avoid knocking, and the controller outputs a control signal for limiting overlap so that scavenging does not occur.

28. The control apparatus of claim 27, wherein the controller outputs a control signal so that the exhaust valve opening (EVO) timing is before the bottom dead center, and the controller outputs a control signal such that the intake valve closing timing (IVC) is retarded rather than the reference intake valve closing (IVC) timing.

29. The control apparatus of claim 27, wherein the controller outputs a control signal so that an intake valve opening timing (IVO) and the exhaust valve closing (EVC) timing are close to a top dead center.

\* \* \* \* \*